United States Patent Office 3,010,808
Patented Nov. 28, 1961

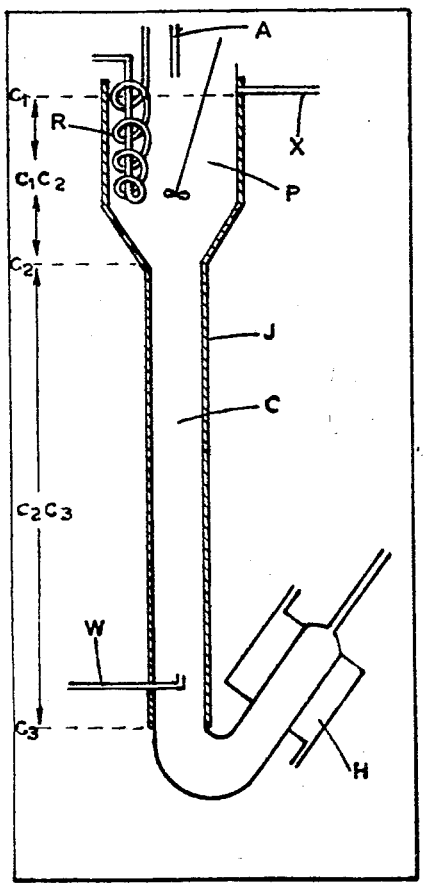
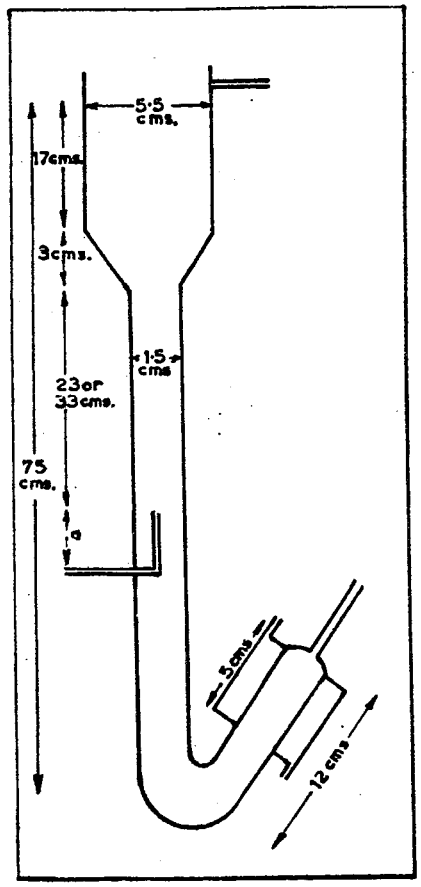

3,010,808
HYDROGEN PEROXIDE
William Raymond Holmes, Luton, John Geoffrey Marshall, Eversholt, near Bletchley, and Alfred Edward Oates, Luton, England, assignors to Laporte Chemicals Limited, Luton, England, a British company
Filed Oct. 27, 1958, Ser. No. 769,874
Claims priority, application Great Britain Nov. 5, 1957
5 Claims. (Cl. 23—297)

This invention relates to the purification of hydrogen peroxide and, in particular, to the recovery in a purified form of hydrogen peroxide-water mixtures from hydrogen peroxide-water mixtures containing at least 61.2% of hydrogen peroxide weight for weight and impurities, which may be inorganic, organic, or both.

It is well known that hydrogen peroxide may be manufactured either by the hydrolysis of certain inorganic per compounds or by the oxidation of certain organic compounds. Thus, for example, United Kingdom specification No. 465,070 describes a process for the production of hydrogen peroxide in which an alkylated anthraquinone is hydrogenated in a solvent, by means of hydrogen in the presence of a catalyst, to the corresponding alkylated quinol, which, after separation from the catalyst, is oxidised with oxygen to produce hydrogen peroxide with regeneration of the alkylated anthraquinone. Such a process may be made cyclic by recycling the alkylated anthraquinone to the hydrogenation state after removal of the hydrogen peroxide by aqueous extraction.

When hydrogen peroxide is manufactured by the hydrolysis of certain inorganic per compounds it often contains free acids as well as inorganic salts in solution, whilst when prepared by the oxidation of certain organic compounds, it usually contains, as impurities, organic compounds often of widely differing volatilities. For example, when prepared by and extracted from a cyclic process as described above, the aqueous hydrogen peroxide leaving the aqueous extraction column is saturated with solvents used in the cyclic process and it may also contain traces of the organic intermediate used. In addition to this, the aqueous hydrogen peroxide may contain other substances formed by the degradation of the solvent or organic intermediate. Where inorganic hydrogen peroxide stabilisers are present in the water used for aqueous extraction, these, too, will be present in the aqueous hydrogen peroxide.

The presence of organic impurities is especially disadvantageous, particularly where the aqueous solution is concentrated to give the aqueous solutions of hydrogen peroxide containing at least 80% of hydrogen peroxide which are required for some industrial and military uses. Degradation of these organic impurities by oxidation naturally causes losses of hydrogen peroxide itself whilst certain of these carbon compounds may cause discoloration of the hydrogen peroxide rendering it unsuitable for some purposes.

The process of the present invention is only applicable to hydrogen peroxide-water mixtures containing at least 61.2% of hydrogen peroxide weight for weight. Processes of the kinds described above do not produce mixtures containing such high concentrations of hydrogen peroxide and the standard method of achieving such concentrations is by distillation. During fractionation under vacuum of aqueous hydrogen peroxide solutions made by the hydrolysis of inorganic per compounds most of the impurities remain in the boiler residue but small fractions pass over either into the overhead waste product or into the fractionated product by virtue of either entrainment of liquid or the volatility of the impurities. In the case of hydrogen peroxide made by an organic process, however, the volatility of the organic impurities may be such that a far greater proportion finds its way either into the overhead waste product or into the fractionated product though, of course, the points at which these impurities appear depend upon their several volatilities. Thus, where aqueous hydrogen peroxide from the aqueous extraction column of a cyclic process as described above is fractionated, the dissolved solvents, if normally steam-volatile are largely recovered in the overhead product, but the degradation compounds appear in the fractionated product or remain in the boiler residue.

Thus, both the fractionated product and the boiler residue may contain either inorganic or organic impurities or both and, provided the hydrogen peroxide content of the aqueous solution is above 61.2% of hydrogen peroxide weight for weight, we have found that purification is possible according to the present invention by means of a combined freezing and washing technique.

Several methods have previously been proposed for reducing the impurities, particularly inorganic impurities, in aqueous solutions. Treatment with an adsorbent solid such as active carbon in the form of finely divided charcoal has been suggested and so has solvent extraction. There are, however, inherent disadvantages in both these processes and especially with solvent extraction when treating aqueous solutions of hydrogen peroxide containing more than 60% hydrogen peroxides weight for weight since the risk of fire is considerable.

It has now been found according to this invention that by washing crystals, formed on cooling aqueous solutions of hydrogen peroxide containing impurities, with aqueous solutions of hydrogen peroxide of substantially the same concentration as the mother-liquor, but containing substantially less or none of said impurities, a high degree of purification is obtained.

According to the present invention a process is provided for purifying hydrogen peroxide-water mixtures containing at least 61.2% hydrogen peroxide weight for weight and contaminated with inorganic and/or organic impurities which comprises subjecting said mixture to cooling at a temperature which is between $-0.5°$ C. and $-56.1°$ C. and to such an extent as to cause the formation of crystals, washing said crystals with a washing solution of aqueous hydrogen peroxide of substantially the same hydrogen peroxide concentration as the mother-liquor but containing none or substantially less of said impurities, recovering the crystals and melting them to yield a hydrogen peroxide-water mixture purified with respect to the mixture originally cooled.

Preferably the formation and washing of the crystals are carried out in an isothermal column, the passage of liquor in the column being counter-current to the passage of crystals.

Preferably also the washing solution percolates through a packed bed of crystals.

Alternatively the slurry of crystals produced on cooling may be filtered or centrifuged prior to washing the crystals with the washing solution.

Preferably the wash liquor is obtained by diluting some of the purified product with distilled water to the concentration of the mother-liquor.

Preferably the mother-liquor and the wash solution when separated from the crystals are concentrated either separately or in admixture and added to the feed material to the system, a purge being provided as an outlet for the impurities.

The invention will now be further described by way of example with reference to the accompanying drawings, wherein:

FIGURE 2 is a vertical section through apparatus suitable for carrying out the process of the present invention by counter-current washing;

FIGURE 4 is a vertical section through apparatus used to provide the experimental results given herein and showing the actual dimensions thereof.

Figure 1:
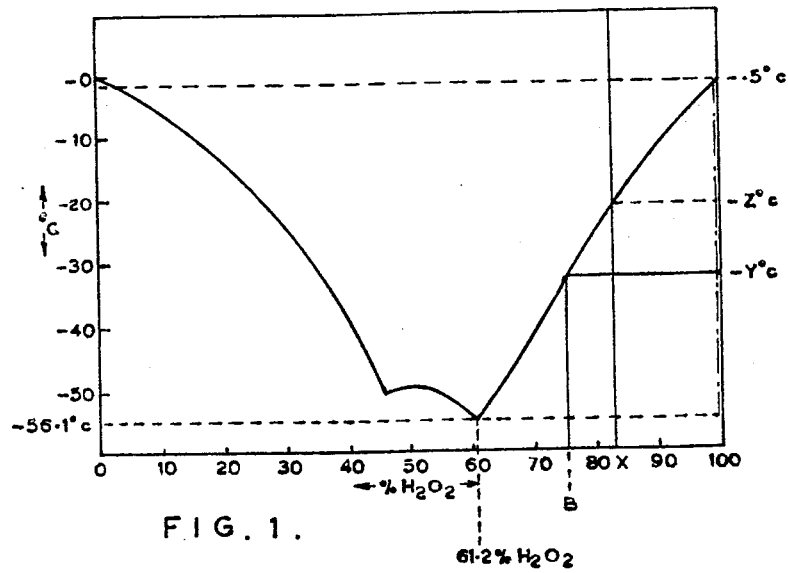
FIGURE 1 is a graph showing the freezing curves for solutions of hydrogen peroxide and water in which temperature is plotted against concentration.

Referring to the drawings, FIGURE 1, with the exception of the line of alternate dots and dashes to which reference is made below, is taken from a publication entitled "Hydrogen Peroxide," by W. C. Schumb, C. N. Satterfield and R. L. Wentworth (April 1955 edition) at page 211. The results of various investigators showed that hydrogen peroxide had the freezing characteristics shown by the solid curves in the graph. Thus, if, for example, a solution of concentration X is cooled to temperature $-Y$, a solid consisting of pure hydrogen peroxide will separate out leaving a mother-liquor of composition B. The solid phase, being denser than the liquid phase, will fall down through the liquid phase and settle as a bed at the bottom of the vessel.

In carrying out the process of the present invention the aqueous hydrogen peroxide washing solution is derived from a source exterior to the vessel in which the crystallisation is being effected. The washing solution is usually fed into the column employed for carrying out the process at the same temperature as that of the mother-liquor into which it is fed in order to ensure that the washing solution is in equilibrium with the crystals at the point of entry. The mass of crystals of 100% hydrogen peroxide formed upon cooling has associated with it a certain proportion of the mother-liquor which is removable by conventional methods only with very considerable difficulty and we believe that, since the crystals are 100% hydrogen peroxide and contain none of the aforementioned impurities, the washing of the crystals with an aqueous solution of hydrogen peroxide reduces the concentration of the impurities in the associated mother-liquor giving a purified product. Therefore, the substantially vertical line of alternate dots and dashes in FIGURE 1 is representative of the fact that crystals of 100% hydrogen peroxide are formed. Purification by freezing and washing in accordance with the process of this invention will, of course, be achieved if the above theory is incorrect, and the utility of the invention is in no way affected by the correctness or otherwise of the theory. It should be noted that the process of the present invention is not applicable to cases where the impurities themselves crystallise out or are deposited in the cooling of the hydrogen peroxide-water mixtures. Colloidal separation of the impurities is, however, permissible since colloidal particles will be removed by the wash solution.

The actual temperature to which the aqueous solution of hydrogen peroxide to be purified has to be cooled in order to secure the production of crystals is easily obtained by reference to FIGURE 1 of the drawings. Thus, in the example given previously a solution of concentration X has to be cooled to temperature $-Z°$ C. to secure any formation of crystals but in order to secure substantial formation it is cooled to a temperature below this and the temperature given in the foregoing example was $-Y°$ C.

Referring now to FIGURE 2 of the drawings, the solution to be purified, e.g. 85% aqueous hydrogen peroxide, is fed into the apparatus at A, the temperature maintained in the zones $C_1C_2$ and $C_2C_3$ being about $-30°$ C. (the cooling being provided by refrigerant passing through coil R and insulation being provided by jacket J). The crystals form in zone $C_1C_2$ in which is disposed a continuously rotating agitator P, and fall and settle into zone $C_2C_3$. The level of the contents is kept constant by the mother-liquor (about 76% hydrogen peroxide in this case) overflowing through X, a filter (not shown) being fitted to prevent crystals leaving the apparatus through X. A bed of crystals forms in zone $C_2C_3$ extending round the bend at the base of column C, and the pressure of the falling crystals drives this bed into a heat exchanger H which is maintained at a temperature high enough to melt all the crystals (e.g. by water at $+15°$ C.). The bend in the tube has been found necessary in practice to prevent the solution formed in heat exchanger H from passing up through the bed of crystals and being lost in the mother-liquor. Since it is an isothermal column no variation in hydrogen peroxide concentration in the liquor or crystals occurs at any stage and there is no temperature gradient other than the sharp rise as the bed of crystals enters the heat exchanger H.

The washing solution is introduced through the tube W at $-30°$ C. and is of the same concentration as the mother-liquor (in this case approximately 76% hydrogen peroxide weight for weight). It reduces the concentration of impurities in the liquor and thus the crystals leaving the bottom of zone $C_2C_3$ for the heat exchanger H take with them a hydrogen peroxide solution of reduced concentration of impurities.

The passing of liquor being in an upwards direction by virtue of the overflow through X, it will be appreciated that such a column may be operated in two ways, but the general principle of crystals passing through a mother-liquor of progressively decreasing impurity concentration applies. Not only can washing solution be made to percolate upwards through a packed column of crystals but also the crystals can be made to fall freely through the liquor until they collect at the bottom of zone $C_2C_3$ and below the point of entry of the tube W. This overflow thus consists of washing solution and the liquor produced by the crystallisation of the fresh 85% hydrogen peroxide feed material.

It should be noted that the final concentration of the hydrogen peroxide obtained after melting of the crystals in heat exchanger H is dependent upon the amount of liquor taken out with the crystals.

The degree of purification obtained depends on (1) the ratio of the amount of washing solution to the amount of mother-liquor reaching the heat exchanger with the crystals, (2) the column length, (3) the liquid flow rates, and (4) the operating temperature. The amount of liquor extracted with the crystals upon melting is capable of determination (see below), the washing ratio, defined as $$\frac{\text{Volume of washing solution}}{\text{Volume of liquor extracted with crystals}}$$

is also capable of determination. Plainly, the greater the washing ratio the greater the purification though obviously for a practical system there are limits to the amount of washing solution that may be employed. The washing ratio being controllable, the degree of purification obtained is also controllable.

The amount of liquor present in the crystals (the run off) as they leave the column is calculated as follows: The hydrogen peroxide concentration is determined by the standard method of titrating with potassium permanganate. The run off (before melting) is assumed to consist of solid 100% hydrogen peroxide plus liquor, the concentration of this liquor being determined by the temperature at which the process is operated. Knowing the concentration of each of the two components and the concentration of the final mixture, the proportion of the two components are calculated.

A portion of the product may be used as the basis for the washing solution. The portion of the product to be used in this manner is diluted with distilled water to the concentration of the mother-liquor cooled to operating temperature and fed to the column C through the tube W. The maximum washing ratios which can be obtained in this way are those corresponding to the return of all the product to the column in the form of washing solution and, of course, in a practical system, the return of all the product is not envisaged. Assuming that the fraction of liquid in the product leaving the bottom of the column is 40% by weight, calculated as shown hereinbefore (the liquor fraction will not always be 40%) the maximum washing ratios are as follows:

| Temperature, ° C. | Corresponding liquor concn., $H_2O_2$ percent | Product $H_2O_2$ concn., percent | Maximum washing ratios |
|---|---|---|---|
| −5 | 95.6 | 98.2 | 2.57 |
| −10 | 91.3 | 96.5 | 2.64 |
| −15 | 87.3 | 94.9 | 2.72 |
| −20 | 83.4 | 93.3 | 2.80 |
| −25 | 79.8 | 91.9 | 2.88 |
| −30 | 76.5 | 90.6 | 2.96 |
| −35 | 73.3 | 89.3 | 3.05 |
| −40 | 70.2 | 88.1 | 3.14 |
| −45 | 67.2 | 86.9 | 3.23 |
| −50 | 64.5 | 85.8 | 3.32 |
| −55 | 61.7 | 84.7 | 3.43 |
| −56.1 | 61.2 | 84.5 | 3.45 |

Thus, in order to obtain purified product from the system, the washing ratios should not equal or exceed the figures given above for the temperatures and concentrations to which they relate. For washing ratios below 1, a maximum purification exists for any given washing ratio and provided the column length is sufficient for the purification to reach this maximum the degree of purification depends only on the washing ratio. For washing ratios above 1 there is no maximum, the purification increasing with both washing ratio and column length.

In actual operation of the counter-current column a certain proportion of the liquor must be run off from the base of the column in order to obtain in the product all the material crystallised in the crystalliser. The proportion of liquor required increases with the throughput of the column but in no case does it fall below 38% by weight. When hydrogen peroxide is crystallised a proportion of solid 100% hydrogen peroxide is formed and this fraction increases as the temperature of crystallisation decreases below the freezing point. There is thus a minimum practical temperature of crystallisation for any given hydrogen peroxide concentration of feed. Conditions represented by the area to the right of the line MN, shown in FIGURE 3 of the drawings which is the freezing point/composition graph for hydrogen peroxide-water mixtures, give less than the above required proportion of liquid and thus the practical conditions of operating for the counter-current method are represented by the shaded area.

The process of the present invention is not limited to operation in a counter-current washing device. An alternative method of operating is to use a continuous rotary filter consisting of a drum slowly rotating, the surface of the drum being formed by a filter medium stretched over a supporting structure. A portion of the drum surface is in contact with a crystal slurry of hydrogen peroxide crystals in a mother-liquor of aqueous hydrogen peroxide, the actual portion altering as the drum rotates. The slurry can be in contact with either the top or bottom of the drum. The interior of the drum is divided radially into sections, and suction and air pressure can be applied to each section in turn. Thus the section in the slurry and several that have just passed through it have suction applied so that crystals adhere to the drum surface and the liquor is filtered off. In a later section washing solution is fed onto the adhering crystals and suction applied inside. A later section has compressed air applied to cause the crytsal cake to leave the drum and be collected.

This method of operation has the advantage that smaller amounts of washing solution are needed than in counter-current washing since a far greater proportion of mother-liquor is removed during filtration than occurs in the settling of the counter-current washing method. A higher degree of purification is therefore achieved for a given return of product hydrogen peroxide as washing solution. A disadvantage of this system is that, in addition to having to handle solids, the whole of the process must be carried out at a temperature below the freezing point of the hydrogen peroxide feed.

Figure 3:
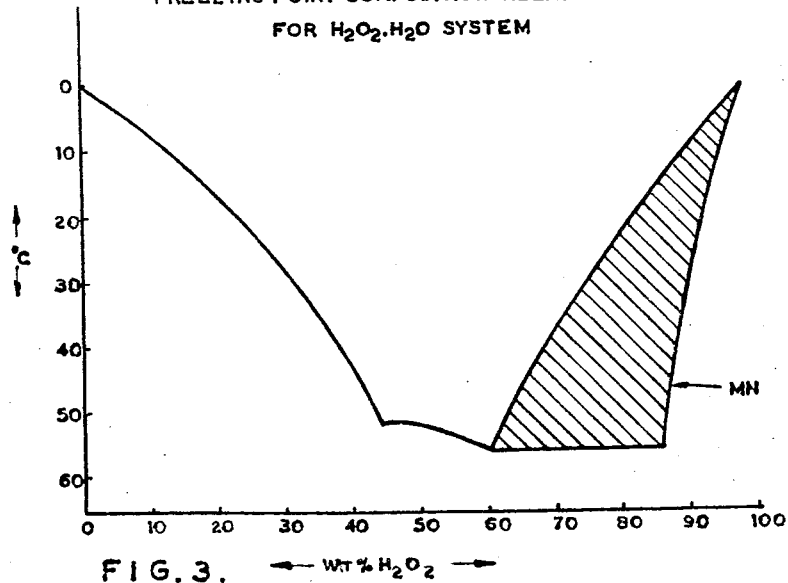
FIGURE 3 is a graph showing the freezing point-composition relationship for the $H_2O_2.H_2O$ system and indicates the working area for a practical system.

Centrifuging of the crystal slurry prior to washing of the crystals is another method of operation. In this case even more mother-liquor is removed from the crystals prior to the application of the washing solution thus further decreasing the amount of washing solution required.

Where the filtration or centrifuging methods are used the crystal slurry has to be fed from a crystalliser to the filter or centrifuge and a limit is set by the minimum fraction of liquor needed for recovery of all the crystals formed in the crystalliser. Thus, again, as in the counter-current washing method the shaded area in FIGURE 3 is representative of the conditions for practical working.

It will be appreciated that the overflow of mixed mother-liquor and washing solution from the counter-current washing system and the filtrates of mother-liquor and washing solution from the methods based on filtration and centrifuging must not be discarded in any practical process. Those liquors are therefore concentrated to the original feed concentration and fed to the crystalliser, a purge being provided as an outlet for impurities. This concentration may be in accordance with our United Kingdom specification No. 590,439, which embodies a system for purging a substantial proportion of the impurities in the feed, but for reasons hereinbefore stated does not eliminate all the impurities.

The following examples illustrate the process of the invention. The experimental results given were obtained using the apparatus illustrated in FIGURE 4 of the drawings.

In these examples the effective column length was either 23 or 33 cms. The actual length of column employed is indicated in each example. The different lengths were obtained by varying the dimension "a" of FIGURE 4.

*Example 1*

84.5% w./w. electrolytic hydrogen peroxide containing 0.5 g./l. of tartrazine was fed in at 490 mls./hr. and cooled to −25° C. at which temperature crystallization occurred. The fraction of feed converted to solid 100% hydrogen peroxide by crystallization was 0.225 by weight. The effective column length was 23 cms.

Washing solution containing 79.8% w./w. hydrogen peroxide at the temperature of operation and containing no impurity was added at the rate of 140 mls./hr. The washing ratio was 1.08.

The product was run off at 227 mls./hr. and contained 51.4% w./w. of liquor.

The tartrazine concentration in the product was 0.009 g./l.

*Example 2*

84.6% w./w. electrolytic hydrogen peroxide containing 1 g./l. of scarlet R was added at 345 mls./hr. The temperature of operation was −25° C. The fraction of feed converted to solid 100% hydrogen peroxide was 0.230 by weight.

Washing solution containing 80.0% w./w. hydrogen peroxide with no impurity, was added at 55 mls./hr. The washing ratio was 0.46. The effective column length was 23 cms.

The product was run of at 189 mls./hr. containing 57.0% w./w. of liquor.

The scarlet R concentration in the product was 0.39 g./l.

*Example 3*

84.5% w./w. electrolytic hydrogen peroxide containing 0.7 g./l. of scarlet R was added at 380 mls./hr.

The temperature was −25° C. and the fraction of feed converted to solid 100% hydrogen peroxide was 0.225 by weight.

Washing solution containing 80.0% $H_2O_2$ with no impurity was added at 230 mls./hr. The washing ratio was 2.07 and the effective column length 33 cms.

The product was run off at 189 mls./hr. containing 57.0% by weight of liquor.

The scarlet R concentration in the product was 0.0002 g./l.

*Example 4*

84.5% w./w. hydrogen peroxide contaminated with organic compounds to an extent equivalent to 4.9 g./l. of carbon was added at 380 mls./hr. The temperature was −25° C. and the fraction of feed converted to solid 100% hydrogen peroxide was 0.225 by weight.

Washing solution containing 80.6% w./w. hydrogen peroxide but containing no organic impurities was added at 110 mls./hr. The washing ratio was 0.96. The effective column length was 23 cms.

The product was run off at 190 mls./hr. containing 58.7% by weight of liquor and organic impurities equivalent to 0.15 g./l. of carbon.

In addition the stability was improved. A 25 ml. sample of the feed evolved oxygen at the rate of 2.9 mls./min. at 100° C. The corresponding figure for the product was 0.25 mls./min. at 100° C.

*Example 5*

95.9% w./w. electrolytic hydrogen peroxide containing 0.6 g./l. of scarlet R was added at 232 mls./hr. The temperature of operation was −7° C. and the fraction of feed converted to solid 100% hydrogen peroxide was 0.328 by weight.

Washing solution containing 93.7% w./w. hydrogen peroxide was added at 158 mls./hr. The washing ratio was 1.25 and the effective column length 33 cms.

The product was run off at 190 mls./hr. containing 65.2% by weight of liquor.

The scarlet R concentration in the product was 0.0006 g./l.

*Example 6*

85.4% w./w. electrolytic hydrogen peroxide containing 0.7 g./l. scarlet R was added at 200 mls./hr. The temperature was −30° C. and the fraction of feed converted to solid 100% hydrogen peroxide was 0.377 by weight.

Washing solution containing 76.4% w./w. hydrogen peroxide containing no dye was added at 72 mls./hr. The washing ratio was 1.56 and the effective column length 33 cms.

The product was run off at 110 mls./hr. containing 36.9% by weight of liquor.

The scarlet R concentration in the product was 0.023 g./l.

*Example 7*

85.3% w./w. electrolytic hydrogen peroxide which had a poor stability (a 25 ml. sample of which evolved oxygen at the rate of 9 mls./min. at 100° C.) was added as feed and the temperature was −25° C.

The washing solution was 80.1% w./w. hydrogen peroxide and the washing ratio 1.30. The effective column length was 33 cms.

The product contained 60.5% by weight of liquor and a 25 mls. sample evolved oxygen at the rate of 2 mls. per minute at 100° C.

What we claim is:

1. A process for removal of impurities from a hydrogen peroxide-water starting solution containing at least 61.2% hydrogen peroxide by weight comprising cooling said starting solution sufficiently to form a crystal-mother liquor mixture within a temperature range of −0.5 to −56.1° C., introducing into said mixture an independent hydrogen peroxide-water washing solution having substantially the same hydrogen peroxide concentration as said mother liquor but containing substantially less of said impurities, recovering said crystals from a substantial portion of the combined mother liquor-washing solution, and melting said recovered crystals in the remaining portion of combined mother liquor-washing solution to yield a purified hydrogen peroxide-water final solution.

2. A process for removal of impurities from a hydrogen peroxide-water starting solution containing at least 61.2% hydrogen peroxide by weight comprising cooling said starting solution sufficiently to form a crystal-mother liquor mixture within a temperature range of −0.5 to −56.1° C., introducing said crystal-mother liquor mixture in a vertical column near the top thereof, introducing into said mixture near the bottom of said column an independent hydrogen peroxide-water washing solution having substantially the same hydrogen peroxide concentration as said mother liquor but containing substantially less of said impurities, removing a substantial portion of the combined mother liquor-washing solution at the top of said column, whereby said crystals pass downwardly by gravity and said washing solution passes upwardly to provide countercurrent washing of said crystals, recovering said crystals at the bottom of said column in the remaining portion of combined mother liquor-washing solution and melting said recovered crystals to yield a purified hydrogen peroxide-water final solution.

3. The process of claim 2 wherein said crystals are removed from the bottom of said column in an integral side extension thereof before said melting.

4. The process of claim 2 wherein said column is isothermal.

5. The process of claim 2 wherein the ratio of said washing solution to said remaining portion of combined mother liquor-washing solution is greater than 1.

References Cited in the file of this patent
UNITED STATES PATENTS

| | | |
|---|---|---|
| 2,724,640 | Crewson | Nov. 22, 1955 |
| 2,912,469 | Wiegandt | Nov. 10, 1959 |